United States Patent [19]

Iwata et al.

[11] 4,295,169
[45] Oct. 13, 1981

[54] CASSETTE LOADING AND UNLOADING DEVICE

[75] Inventors: Mitsuo Iwata; Hajime Wada; Tomoyuki Iwasa; Kunio Tsuchino, all of Tottori, Japan

[73] Assignees: Sanyo Electric Co., Ltd., Osaka; Tottori Sanyo Electric Co., Ltd., Tottori, both of Japan

[21] Appl. No.: 86,318

[22] Filed: Oct. 19, 1979

[30] Foreign Application Priority Data

Oct. 19, 1978 [JP] Japan .............................. 53-130191

[51] Int. Cl.³ ...................... G11B 15/66; G11B 23/06
[52] U.S. Cl. ...................................... 360/71; 360/93; 360/96.5; 360/105
[58] Field of Search .................. 360/71, 93, 105, 96.1, 360/96.5; 242/197-200

[56] References Cited

U.S. PATENT DOCUMENTS

| | | | |
|---|---|---|---|
| 3,684,296 | 8/1972 | Ban | 360/93 |
| 3,684,299 | 8/1972 | Clark | 360/93 |
| 3,758,119 | 9/1973 | Harlan | 360/71 |
| 3,758,121 | 9/1973 | Walsh | 360/71 |
| 3,882,542 | 5/1975 | Nakamichi | 360/71 |
| 3,972,073 | 7/1976 | Bara | 360/71 |
| 3,984,871 | 10/1976 | Desai | 360/93 |
| 4,071,859 | 1/1978 | Sami | 360/96.5 |

*Primary Examiner*—Alfred H. Eddleman
*Attorney, Agent, or Firm*—Armstrong, Nikaido, Marmelstein & Kubovcik

[57] ABSTRACT

A cassette loading and unloading device has a guiding element for positioning a cassette either in an ejected position or in an inserted position, a spring for urging the guiding element towards the ejected position and a locking element for locking the guiding element in the inserted position. The locking element is held in a locked position by the energization of an electromagnet which is effected during the closure of a switch. The release of the guiding element from the locking element and the movement of the guiding element to the ejected position are established when the switch is turned off to de-energize the electromagnet.

8 Claims, 20 Drawing Figures

CASSETTE LOADING AND UNLOADING DEVICE

BACKGROUND OF THE INVENTION

The present invention relates to tape cartridge or cassette loading and unloading devices for tape recorders and tape players. More particularly, it relates to loading and unloading devices that automatically eject the tape cartridge or cassette when the tape recorder or player loses electric power.

Recently, it has become popular to equip automobiles with cassette players and recorders, tape machines, which automatically start to play when the cassette tape is inserted. To facilitate cassette insertion, the player or recorder is often provided with an automatic intake mechanism which pulls a manually, partially inserted cassette into the final loaded position. Such a device is disclosed in Yasuo Sami's U.S. Pat. No. 4,071,859 issued Jan. 31, 1978.

Generally, an automobile has a main electric power switch switched on and off by the turning of a key inserted to start the automobile. When the main switch is on, electricity is supplied from a source, for example, a battery, to the tape machine allowing operation. If the automobile's main switch is turned off during play, the cassette normally remains held in the play position with only the tape machine's motor being cut off. In such a situation, a pinch roller provided for transmitting the motor's drive to the tape remains tightly held in contact with a capstan. This has the disadvantage that the pinch roller may become so deformed that afterwards, when play is resumed, there will be unacceptable wow in the tape machine's reproduced signal. Further, that portion of the tape slightly held between one of the cassette reels and the pinch roller and capstan junction during power cut-off may be undesirably permantly stretched.

To prevent such disadvantages, it is preferable to employ an automatic eject mechanism in the player or recorder. However, it has been difficult to employ both the automatic intake mechanism and the automatic eject mechanism in one player or recorder since the direction of pulling the cassette by the automatic intake mechanism is opposite to that by the automatic eject mechanism.

SUMMARY OF THE INVENTION

Accordingly, a primary object of our invention is to provide a cassette loading and unloading device for tape machines which automatically ejects the inserted cassette when electric power is cut off.

Another object of our invention is to provide a cassette loading and unloading device of the above described type having an intake mechanism for forcibly completing the loading of the cassette when the cassette is manually partially inserted into the device.

A further object is to provide a cassette loading and unloading device of the above described type of simple construction that can be readily manufactured at low cost.

In accordance with a preferred embodiment of the invention, a cassette loading and unloading device is provided as follows. The device has a guiding means movable between an initial position and an inserted position. The guiding means is operable to hold a cassette in an ejected condition when moved to the initial position and to hold the cassette in an inserted condition when moved to the inserted position. There are also a bias means for biasing the guiding means towards the initial position, and a locking means movable between a locked position and an unlocked position. The locking means, when shifted to the locked position in response to the insertion of a cassette, locks the guiding means in the inserted position. When the locking means is shifted to the unlocked position, it allows the guiding means to return from the inserted position back towards the initial position. There is also an actuating means, operatively associated with the locking means, to restrain the locking means when it has been shifted to the locked position. A normally closed switch means is connected between an electric power source and the actuating means to supply an electricity to energize the actuating means. The switch means is adapted to be turned off to interrupt the electricity to the actuating means, de-energizing it. This causes the locking means which has been held in the locked position to shift to the unlocked position, allowing the bias means to move the guiding means from the inserted position towards the initial position.

According to a preferred embodiment of the present invention, the actuating means is an electromagnet, and further comprises an intake mechanism operatively associated with the guiding means for forcibly drawing the guiding means which has been pushed intermediately between the initial and inserted positions, to the inserted position. There is also a disabling means operatively associated with the locking means for disabling the drawing force of the intake mechanism when the locking means is moved towards the locked position.

BRIEF DESCRIPTION OF THE DRAWINGS

The foregoing and other objects, features and advantages of the invention will be apparent from the following description of the invention with reference to the accompanying drawings in which.

DETAILED DESCRIPTION OF THE INVENTION

Before the description of the present invention proceeds, it is to be noted that like parts are designated by like reference numerals throughout the accompanying drawings.

Figure 1:
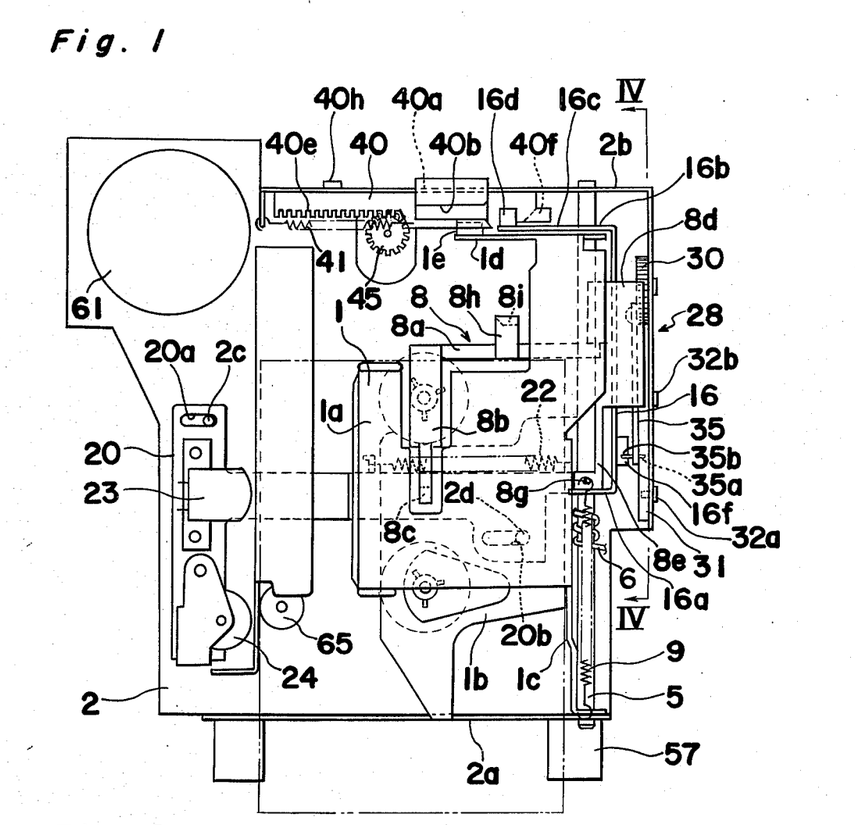
FIG. 1 is a top plan view of a cassette loading and unloading device according to the present invention.
Figure 2:
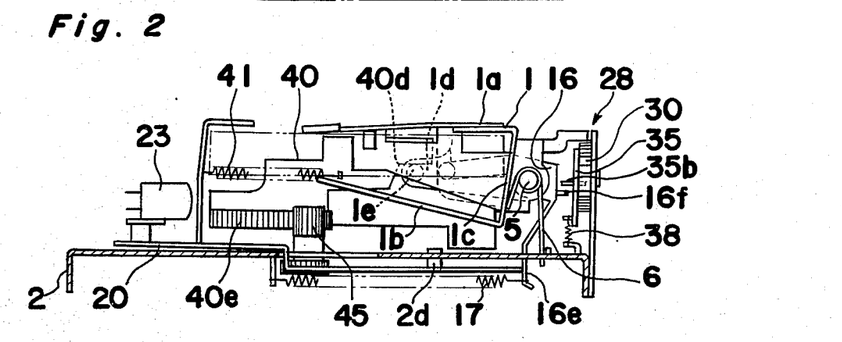
FIG. 2 is a front elevational view of the cassette loading and unloading device shown in FIG. 1.

Referring to FIGS. 1 and 2, a cassette loading and unloading device of the present invention includes a frame 2 having a front upright panel 2a and a back upright panel 2b. A shaft 5 extends between the front and back panels 2a and 2b at the right-hand side of the frame 2. A cassette holder 1 has an upper plate 1a, a lower plate 1b and a side plate 1c all assembled to assume a substantially U-sectioned casing, as best shown in FIG. 2. The side plate 1c extends closely adjacent and parallel to the shaft 5 and is pivotally mounted on the shaft 5. The cassette holder 1 has an arm 1d extending perpendicular to the shaft 5 and carrying a roll 1e at the free end portion of the arm 1d. A coil spring 6 is mounted on the shaft 5 and has one end connected to the frame 2 and the other end connected to the side plate 1c of the cassette holder 1 so that the cassette holder 1 is urged to rotate in a clockwise direction when viewed in a direction of insertion of the cassette. Accordingly, when the cassette is temporarily inserted in the cassette holder 1, the cassette holder 1 holds the cassette in a raised position as shown in FIG. 2.

Figure 3:
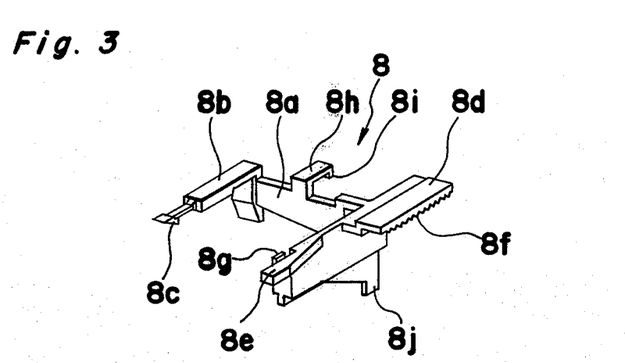
FIG. 3 is a perspective view of a guiding element employed in the cassette loading and unloading device.
Figure 7:
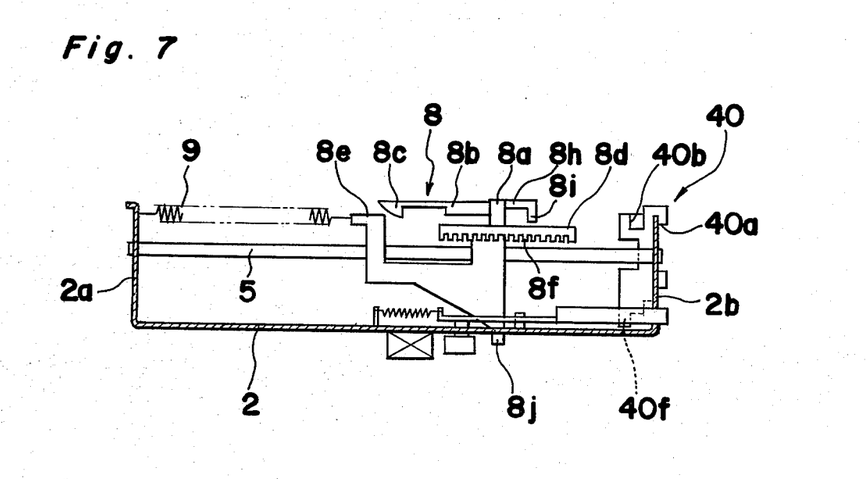
FIG. 7 is a schematic side view showing a manner in which the guiding member is accommodated.

Slidably mounted on the shaft 5 is a guiding element 8 which is best shown in FIG. 3 and has a stem 8a extending perpendicular to the shaft 5 and a finger 8b extending from the stem 8a and terminating in a recess formed in the upper plate 1a of the cassette holder 1. A tapered pawl 8c projects downwardly from the tip of the finger 8b. Since the finger 8b is made of a thin plate, the finger 8b may wobble up and down as if it were a leaf spring. The guiding element 8 includes a plate 8d at the right-hand side of the shaft 5 and an arm 8e extending from the plate 8d in parallel to the shaft 5. The plate 8d has a rack 8f, defined on the undersurface thereof facing downwards as viewed in FIG. 3. The arm 8e in the state shown in FIG. 1 is held in contact with one end 16a of a lever 16 and has a projection 8g to which one end of a coil spring 9 is secured. The other end of the coil spring 9 is connected to the front upright panel 2a of the frame 2 so that the guiding element 8 is urged in a direction counter to the direction of insertion of the cassette. The guiding element 8 also includes another finger 8h extending from intermediate portion of the stem 8a in a direction opposite to the previous mentioned finger 8b, and an engagement pin 8i extending downwardly from the tip of the finger 8h. A body of the guiding element 8 extends downwardly from one end of the stem 8a remote from the finger 8d for constituting a leg projection 8j. The projection 8j projects downwardly from the frame 2, as shown in FIG. 7, through an elongated slot 2e which extends in parallel to the shaft 5. The guiding element 8 is movable between an initial position in which the stem 8a is located substantially intermediately between the front and back upright panels 2a and 2b, as shown in FIG. 1, and an inserted position in which the stem 8a is located close to the back upright panel 2b.

In the initial position of the guiding element 8, the cassette may be partly inserted into the cassette holder 1, with one of its short sides facing the cassette holder 1 being held in contact with the stem 8a of the guiding element 8, as shown by the phantom line in FIG. 1, and one of the holes in the cassette aligned with respective reels inside the cassette, which is located on the leading side with respect to the direction of insertion of the cassette into the holder 1 receives the pawl 8c for preventing the cassette from being falling out from the cassette holder 1. The cassette held by the guiding element 8 in the initial position can be considered as being held in an ejected position.

Referring particularly to FIG. 1, a substantially T-shaped supporting plate 20 for supporting a magnetic head 23 and a pinch roller 24 is movably mounted on the frame 2 in a direction traversely of the shaft 5 by means of guide pins 2c and 2d which extend from the frame 2 and are loosely engaged in corresponding guide slots 20a and 20b defined in the supporting plate 20. As shown in FIG. 2, a portion of the supporting plate 20 on which the magnetic head 23 and the pinch roller 24 are mounted extends above the frame 2 while a portion of the supporting plate 20 extending towards the right hand side of the frame 2 extends beneath the frame 2. The supporting plate 20 is movable between operative and inoperative positions, tending to assume the operative position by the action of a coil spring 22 connected between the supporting plate 20 and the frame 2, as shown in FIG. 1. The movement of the supporting plate 20 between the operative and inoperative positions is controlled by a lever 16 which is described hereinbelow.

The lever 16 is pivotally mounted on the shaft 5 at a front end portion 16a thereof and at a back end portion 16b thereof. An arm 16c extends from the back end portion 16b of the lever 16 for carrying a roll 16d at the free end of the arm 16c. Extending from the front end portion 16a of the lever 16 downwardly through the frame 2 is a leg 16e which is, as best shown in FIG. 2, held in contact with the T-shaped supporting plate 20 and is connected to one end of a coil spring 17. The other end of the coil spring 17 is connected to the frame 2 for urging the lever 16 in a clockwise direction about the shaft 5. Since the biasing force of the spring 17 is stronger than that of the spring 22, the T-shaped supporting plate 20 is normally held in the inoperative position in which the magnetic head 23 is held away from the path of travel of a magnetic tape inside the cassette and, at the same time, the pinch roller 24 is separated away from a capstan 65. On the other hand, when the lever 16 is rotated in counterclockwise direction in a manner described later, the T-shaped supporting plate 20 is released from the biasing force of the spring 17, transmitted thereto through the leg 16e, and therefore the plate 20 is moved to the operative position as biased by the spring 22. In the operative position of the plate 20, the magnetic head 23 is slidingly engageable with the magnetic tape inside the cassette and, at the same time, the pinch roller 24 is held in contact with the capstan 65 for driving the tape from one reel to another inside the cassette.

The lever 16 further includes a projection 16f extending from the front end portion 16a in a right-hand side direction. The projection 16f comes into contact with and moves a pin 35b of a crank lever 35, described in detail later, upwardly when the lever 16 is rotated in a counterclockwise direction.

Figure 4:
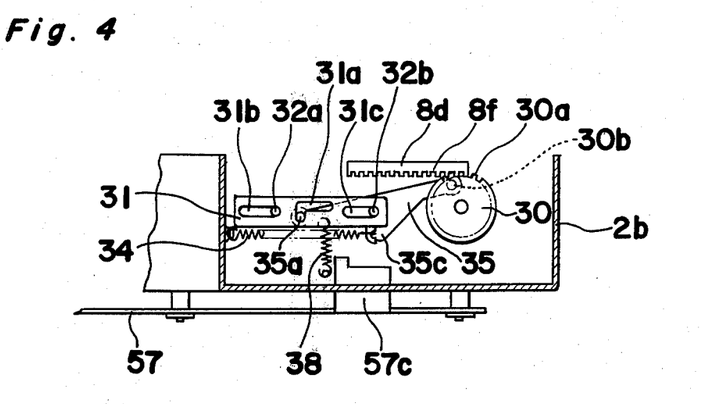
FIG. 4 is a cross-sectional view taken along the line IV—IV shown in FIG. 1.

An intake mechanism 28 is provided on the right-hand side of the frame 2 as viewed in FIG. 1 and comprises, as best shown in FIG. 4, a crank wheel 30 having its periphery formed with a pinion gear 30e for engagement with the rack 8f of the guiding element 8, a crank lever 35 pivotally connected at one end thereof to a peripheral portion of the crank wheel 30 in eccentric relation to the axis of rotation of the wheel 30 by a pin 30b, the other end of the crank lever 35 being engaged with a rectangular movable plate 31 in such a manner that a pin 35a extending from the lever 35 is inserted into an L-shaped slot 31a formed in a substantially intermediate portion of the rectangular movable plate 31. The movable plate 31 is formed with elongated slots 31b and 31c one on each side of the L-shaped slot 31a, through which slots 31b and 31c pins 32a and 32b extend respectively from the frame 2. A spring 34 is connected between the plate 31 and the frame 2 for urging the plate 31 in a left-hand side direction when viewed in FIG. 4. A spring 38 is connected between the crank lever 35 and the frame 2 for holding the pin 35a of the crank lever 35 in an engaged position with respect to a vertically extending slot area of the L-shaped slot 31a so that the crank lever 35 can move together with the movable plate 31.

Figure 5A:
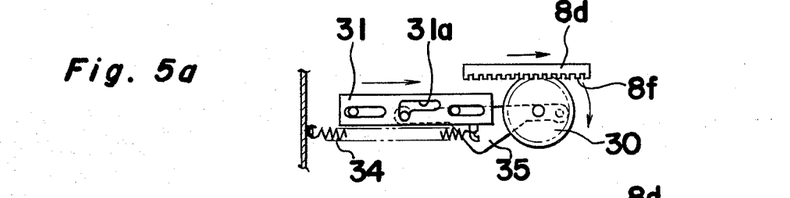
FIGS. 5a to 5d are schematic side views of an intake mechanism employed in the cassette loading and unloading device and showing the sequence of operation thereof.
Figure 5B:
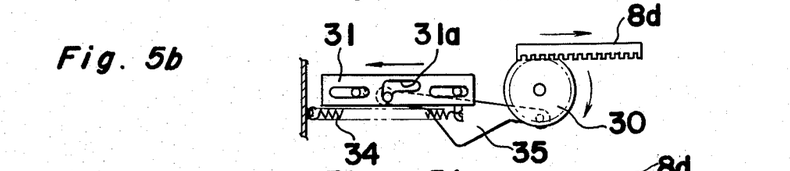

When the guiding element 8 is in the initial position, as shown in FIG. 1, the pinion gear 30a is engaged with the right-hand side of the rack 8f when viewed in FIG. 4. In this position of the guiding element 8, the pin 30b on the crank wheel 30 is located close to the teeth of the rack 8f and, in this condition, the crank wheel 30 formed with the pinion gear 30a is biased to rotate in a counterclockwise direction by the spring 34. When the cassette is pushed in, the rack 8f is moved to the right-hand side direction. During the movement of the rack 8f in the right-hand side direction, the biasing force of the spring 34 acts on the crank wheel 30 in the counterclockwise direction until the crank wheel 30 is rotated to such a position that the pin 30b is located at the furthest position from the plate 31, as shown in FIG. 5a. Thereafter, the crank wheel 30 is biased in the clockwise direction by the spring 34 for forcibly moving the rack 8f further to the right-hand direction until the pins 32a and 32b come into contact with a right-hand side end of the elongated slots 31b and 31c, respectively, as shown in FIG. 5b. The sequential operation of the crank wheel 30 and the crank lever 35 as described above is referred to as a crank motion.

With the above arrangement, when the cassette which has been partly inserted in the cassette holder 1 as shown in FIG. 1 is further pushed a short distance against the biasing force of the spring 9 and the biasing force of the spring 34, the intake mechanism 28 forcibly pulls the cassette into a fully inserted position, although, at this moment, the cassette is still held in the raised position.

Figure 6:
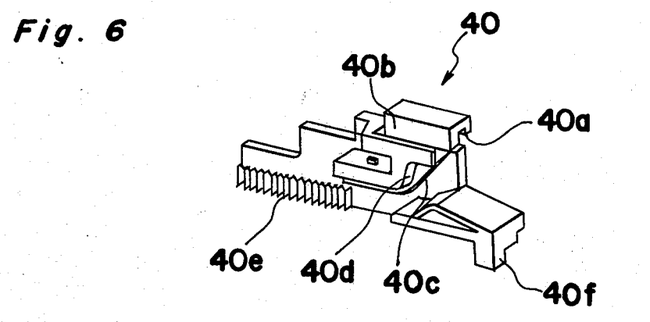
FIG. 6 is a perspective view of a sliding block employed in the cassette loading and unloading device.
Figure 11A:
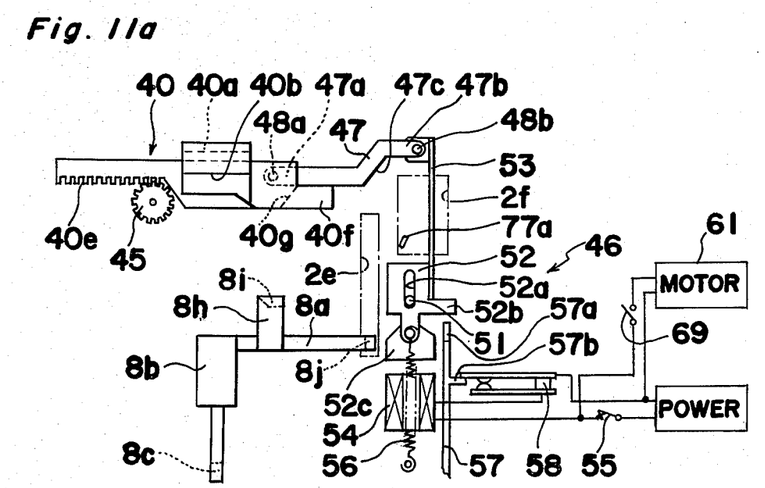
FIGS. 11a to 11d are schematic top plan views of a locking mechanism showing the sequence of operation thereof.

Referring to FIGS. 1 and 6, a sliding block 40 is formed with an upwardly recessed groove 40a for slidingly receiving an upper edge portion of the back panel 2b of the frame 2 for allowing the block 40 to be guided movably in a direction traverse the shaft 5. Provided adjacent to and in parallel to the groove 40a in another groove 40b which receives the engagement pin 8a provided in the guiding element 8. The block 40 has two slanted faces defined at 40c and 40d under the groove 40b, the first slanted face 40c including a face slanted with respect to the direction of movement of the sliding block 40 and a face parallel to the above mentioned direction. The first slanted face 40c is provided for the roll 16d of the lever 16 to roll over the slanted and parallel faces. On the other hand, the second slanted face 40d includes an upper parallel face, a slanted face and a lower parallel face and is provided for the roll 1e of the cassette holder 1 to roll over these faces. The sliding block 40 is further provided with a rack 40e on a front surface thereof and a projection 40f extending downwardly from the block 40. The projection 40f includes a slanted face 40g at the back thereof as shown in FIG. 11a. When the sliding block 40 is mounted on the back panel 2b, the groove 40a slidingly receives the upper edge of the back panel 2b while a pin 40h (FIG. 1) projecting backwardly from the block 40 is inserted into an elongated slot formed in the back panel 2b for preventing the block 40 from being moved upwardly. A coil spring 41 is connected between the frame 2 and the sliding block 40 for urging the sliding block 40 in a left-hand direction towards a disengaged position in which a pinion gear 45 mounted on the frame 2g (FIG. 9) is engaged with the right-hand side of the rack 40e.

Figure 9:
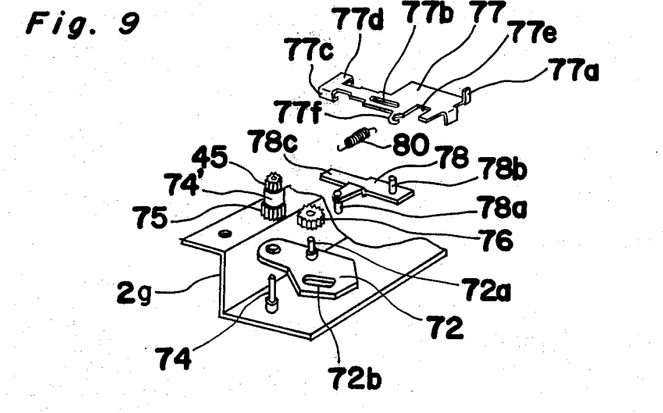
FIG. 9 is an exploded view of a transmission mechanism employed in the loading and unloading device.

After the cassette is fully inserted, the pinion gear 45 is rotated by a transmission mechanism 73, described later, for moving the sliding block 40 towards a right-hand direction against the biasing force of the spring 41. More particularly, when the cassette is fully inserted into the cassette holder 1 as drawn by the intake mechanism 28, the leg projection 8j of the guiding element 8 actuates the transmission mechanism 73 causing the pinion gear 45 to rotate in a clockwise direction when viewed in FIG. 1. Thereupon, the sliding block 40 advances from the disengaged position towards an engaged position in which the pin 8i of the guiding element 8 is engaged with groove 40b, formed in the sliding block 40, to hold the guiding element 8 in the inserted position. During the movement of the sliding block 40 from the disengaged position towards the engaged position, the rolls 1e and 16d roll on the slanted faces 40d and 40c, respectively. Accordingly, the arms 1d and 16c carrying the rolls 1e and 16d, respectively, are pushed down. The pushing down of the arm 1d causes the cassette holder 1 to descend against the biasing force of the spring 6 while the pushing down of the arm 16c causes the lever 16 to rotate in a counterclockwise direction about the shaft 5 against the biasing force of the spring 17. Such a rotation of the level 16 moves the leg portion 16e of the lever 16 in the right-hand side direction as viewed in FIG. 2, for moving the T-shaped supporting plate 20 towards the operative position as biased by the spring 22, thus causing the magnetic head 23 to contact the magnetic tape in the cassette.

Noted that intake mechanism 28 holds guiding element 8 in the inserted position before pin 8i engages groove 40b so that the biasing force of spring 34 acting on the plate 31 is transmitted to the crank wheel 30 through the engagement between pin 35a and the vertically extending slot area of L-shaped slot 31a, as shown in FIG. 5b. In this position of FIG. 5b, there is a space left on the right-hand side of the respective pins 32a and 32b in each of the slots 31b and 31c.

Figures 5C, 5D:
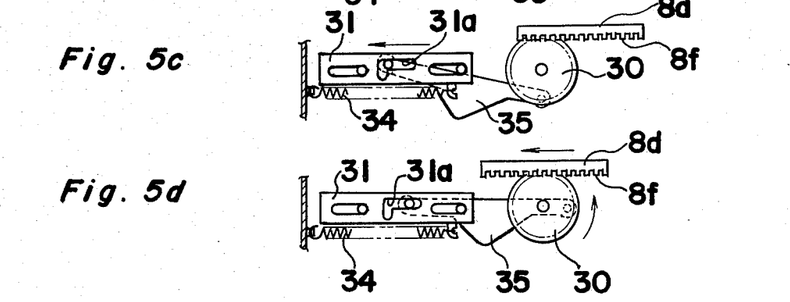

After the establishment of engagement between the engagement pin 8i and the groove 40b, the rotation of the lever 16 about the shaft 5 in the manner described above results in a contact between the projection 16f of the lever 16 and the pin 35b of the crank lever 35. A further rotation of the lever 16 pushes the pin 35b upwardly in contact with the projection 16f. Accordingly, the pin 35a which is provided on one side of the crank lever 35 opposite to the pin 35b is raised up for locating the pin 35a in association with the horizontally extending slot area of the L-shaped slot 31a, as shown in FIG. 5c. Therefore, the intake mechanism 28 does no longer hold the guiding element 8 in the inserted position.

The description is now directed to the transmission mechanism 73.

Figure 8:
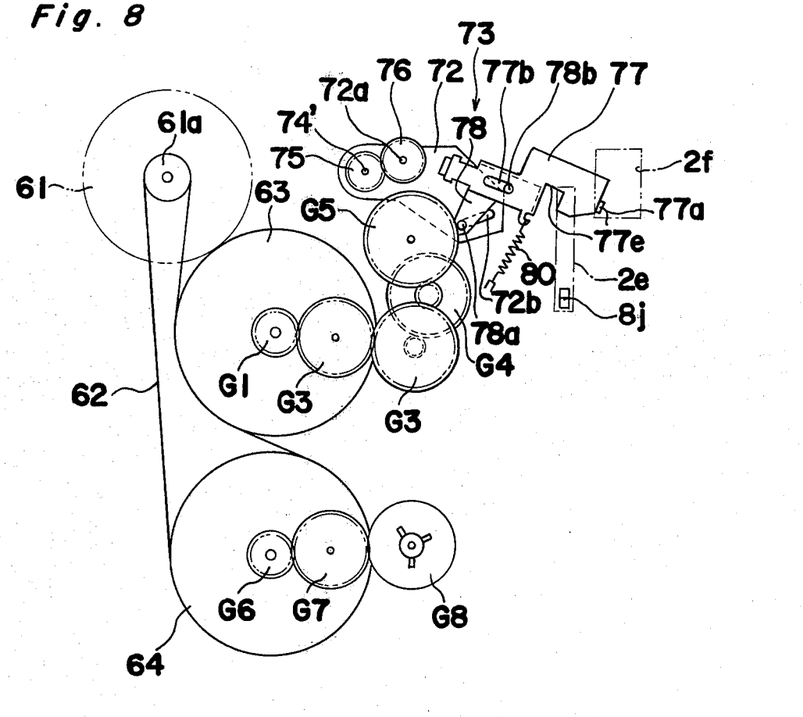
FIG. 8 is a schematic top plan view of a driving force transmission system.
Figure 10:
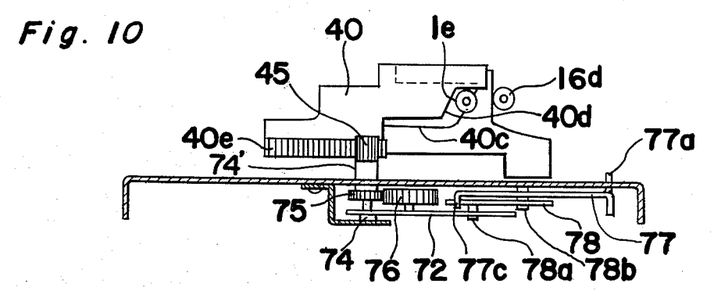
FIG. 10 is a schematic side view showing a relation between the transmission mechanism and the sliding block.

Referring to FIGS. 8 to 10, the transmission mechanism 73 comprises a movable plate 72 pivotally mounted on a pin 74 projecting from an arm 2g (FIG. 9) extending downwardly from the frame 2. An axis 74' is concentrically mounted on the pin 74 and extends above the frame 2 through a suitable opening. A gear 75 is rigidly mounted on the axis 74' in a space between the frame 2 and the plate 72 while the pinion gear 45 is rigidly mounted on the axis 74' above the frame 2, as shown in FIG. 10, so that the rotation of the gear 75 can be transmitted to the pinion gear 45. The movable plate 72 is provided with a pin 72a for rotatably receiving a gear 76 which is engaged to the gear 75. A T-shaped lever 78 is mounted on the plate 72 by means of a pin 78a extending downwardly from the lever 78 and loosely engaged in a corresponding guide slot 72b formed in the plate 72. A suitable nut or a retaining ring is rigidly mounted on the free end of the pin 78a for preventing the pin 78a from falling downwardly through the slot 72b. A movable plate 77 having an upwardly bent projection 77a, a slot 77b, a pair of holding arms 77c and 77d and a concaved recess 77e is mounted on the lever 78 in such a manner that the slot 77b loosely receives a pin 78b projecting upwardly from the lever 78 while the pair of arms 77c and 77d slidingly hold an elongated portion 78c of the lever 78. A movable plate 77 further includes a hook 77 which is connected to one end of a coil spring 80. The other end of the coil spring 80 is connected to the frame 2 for normally biasing the movable plate 72, lever 78 and plate 77 to rotate about the pin 74 in a clockwise direction when viewed in FIG. 8. The rotation of the plate 77 is restricted by an engagement between the projection 77a and a rectangular opening 2f formed in the frame 2 to such an extent that the plate 72 moves between an engaged position and a disengaged position which will be described later.

Provided adjacent the transmission mechanism 73 is a first train of gears including gears G1, G2, G3, G4 and G5 for transmitting the rotating force of a first idler wheel 63 to the gear G5. According to the embodiment, the axis of the gear G3 is rigidly connected to an axis for effecting the rotation of one of supply and take-up reels inside the cassette. A second train of gears includes gears G6, G7 and G8 for transmitting the rotating force of a second idler wheel 64 to the gear G8 which is coaxially connected to an axis for effecting the rotation of the other one of the reels of the cassette. A rubber belt 62 is passed around the second idler wheel 64 and a sheave 61a connected to a motor 61. One of the opposed runs of the rubber band 62 is held in contact with the first idler wheel 63 so that the rotation of motor 61 in one direction causes the first idler wheel 63 to rotate in the direction opposite to the direction of the motor 61 and the second idler wheel 64 to rotate in the same direction as the motor 61. The motor 61 is connected to a source of electric power through a motor control switch 69 (FIG. 11a) which is according to a preferred embodiment turned on and off when the guiding element 8 is moved to the inserted and initial positions, respectively.

Figure 12A:
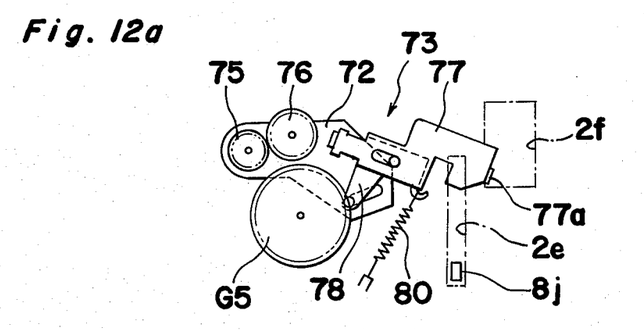
FIGS. 12a and 12c are schematic top plan views of the transmission mechanism showing the sequence of operation thereof.
Figure 12B:
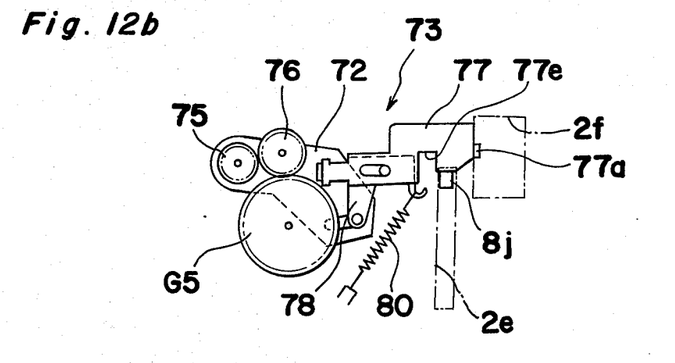
Figure 12C:
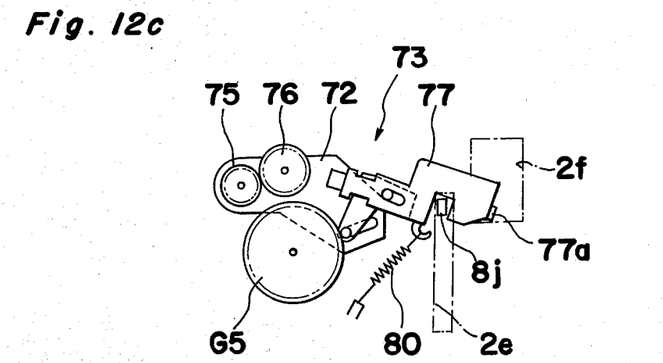

When the plate 72 of the transmission mechanism 73 is in the disengaged position, as shown in FIG. 8, the gear 76 mounted on the plate 72 is retracted from the gear G5 of the first gear train so that no driving force can be applied to the pinion gear 45 (FIG. 8). On the other hand, when the plate 72 of the transmission mechanism 73 is in the engaged position, as shown in FIG. 12b, the gear 76 is engaged with the gear G5 so that the pinion gear 45 can drive the sliding block 40 from the disengaged position to the engaged position against the biasing force of the spring 41. The sliding block 40 which has moved to the engaging position in the manner described above is held thereat by a locking mechanism 46 described hereinbelow.

Figure 11B:
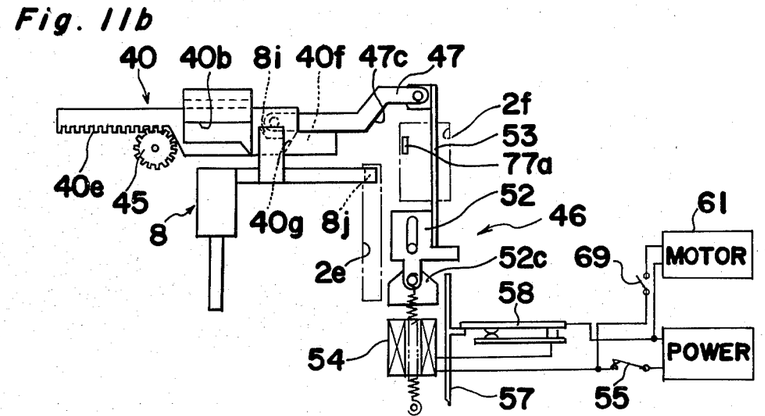
Figure 11C:
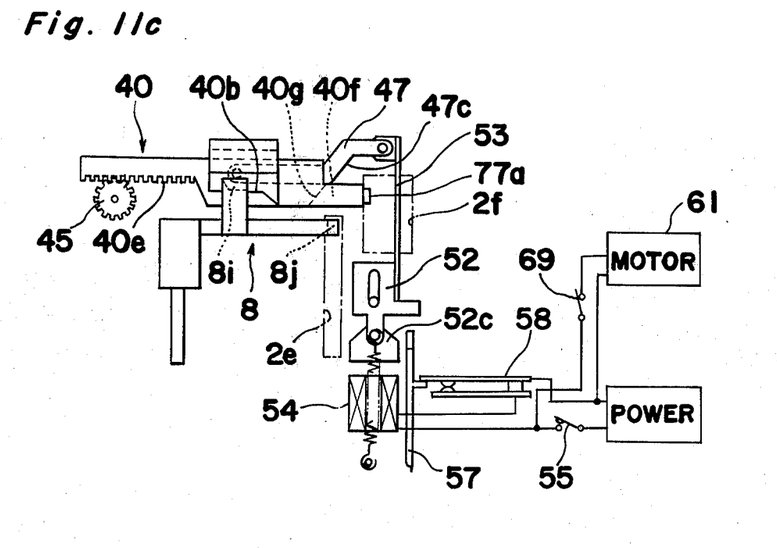
Figure 11D:
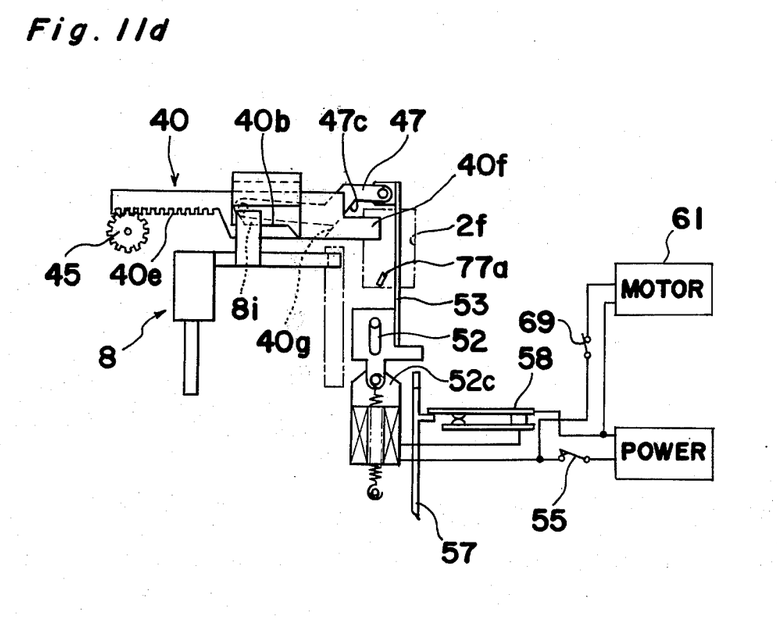

Referring to FIG. 11a, the locking mechanism 46 comprises a retaining lever 47 having one end 47a thereof pivotally connected to the frame 2 below the sliding block 40 by a suitable pin 48a and the other end 47b thereof pivotally connected to one end of an actuating lever 53 by a pin 48b. A substantially intermediate portion of the retaining lever 47 is formed with a slanted edge 47c engageable with the slanted face 40g of the sliding block 40 for maintaining the sliding block 40 in the engaged position as shown in FIG. 11d. The other end of the actuating lever 53 remote from the end connected to the retaining lever 47 is provide with a plate 52 having a slot 52a extending in parallel to the shaft 5, an arm 52b and a segment 52c made of metal. The stroke of movement of the actuating lever 53 together with the plate 52 is defined by the slot 52a into which a pin 51 extending from the frame 2 is loosely engaged. An electromagnet 54 is provided adjacent the segment 52c for pulling the segment 52c downwardly, when viewed in FIG. 11a, towards the electromagnet 54. A coil spring 56 is connected between the plate 52 and the frame 2 for urging the segment 52c towards the electromagnet 54.

Normally, that is, when the sliding block 40 is in the disengaged position, the retaining lever 47 is blocked from being rotated clockwise by the projection 40f of the sliding block 40 so that the segment 52c is separated away from the electromagnet 54. On the other hand, when the sliding block 40 is moved to the engaged position, as shown in FIG. 11d, the contact between the slanted edge 47c of the retaining lever 47 and the slanted face 40g takes place and, therefore, the retaining lever 47 is rotated in the clockwise direction about the pin 48a so that the segment 52c is held in contact with the electromagnet 54.

The electromagnet 54 has two terminals one terminal being connected through an subsidiary switch 58 to one terminal of a source of electric power while the other terminal is connected through a main switch 55 to the other terminal of the power source. The main switch 55 may be a power supplying switch provided in the automobile for supplying electric power to various electrical appliances in the automobile. On the other hand, the subsidiary switch 58 which is a normally closed switch is operatively coupled to a manually operable lever 57 described hereinafter.

The manually operable lever 57 is provided adjacent the plate 52 with its free end 57a positioned close to the arm 52b of the plate 52 and includes a projection 57b which is adapted to open the switch 58 when the lever 57 is pushed in. Accordingly, the push of the lever 57 de-energizes the electromagnet 54 on one hand and, move the segment 52c away from the electromagnet 54 on the other hand. The resultant is that the actuating lever 53 is pushed up and thus the engagement between the slanted edge 47c of the retaining lever 47 and the slanted face 40g of the sliding block 40 is released for allowing the sliding block 40 to move back to the disengaged position.

Now, the operation of the cassette loading and unloading device of the present invention is described.

When the main switch 55 is turned on, an electric power is supplied to the electromagnet 54. When the cassette is subsequently inserted into the cassette holder 1 from the partly inserted position, the intake mechanism 28 is actuated to forcibly draw and hold the cassette in the fully inserted position in the holder 1. The insertion of the cassette is accompanied by the movement of the guiding element 8 from the initial position to the inserted position with the leg projection 8j of the guiding element 8 moving along the slot 2e (FIGS. 11a and 11b). At the end of the movement of the guiding element 8, the leg projection 8j comes into contact with and pushes the movable plate 72 for turning the transmission mechanism 73 from the disengaged position, as shown in FIG. 12a, to the engaged position as shown in FIG. 12b. In addition to the above, the movement of the guiding element 8 from the initial position to the inserted position results in the closure of the motor control switch 69 for energizing the motor 61. Thereupon, the driving force of the motor 61 is transmitted through the first train of gears to the pinion gear 45 for moving the sliding block 40 from the disengaged position (FIG. 11b) to the engaged position (FIG. 11d).

During the movement of the sliding block 40 from the disengaged position to the engaged position, the rolls 1e and 16d are pushed down as they roll over the slanted faces 40d and 40c, respectively. When the roll 1e is pushed down in this manner, the cassette holder 1 is rotated in a counterclockwise direction about the shaft 5 to bring the cassette to a properly accommodated position where the reels in the cassette are engaged with driving axes projecting from the frame 2. On the other hand, when the roll 16d is pushed down in this manner, the lever 16 is rotated in a counterclockwise direction about the shaft 5 with the T-shaped supporting plate 20 consequently moved from the inoperative to operative position. Accordingly, the magnetic head 23 fully contacts the tape while the pinch roller 24 pushed the tape against the capstan 65. In addition to above, the movement of the sliding block 40 to the engaged position results in the engagement between the groove 40b and the engagement pin 8i and, therefore, the guiding element 8, at this moment, is held in the inserted position not only by the intake mechanism 28 but also by the engagement between the groove 40b and the pin 8i.

The further rotation of the lever 16 in a counterclockwise direction about the shaft 5 causes the projection 16f of the lever 16 to push the pin 35b of the crank lever 35 upwardly. Accordingly, the pin 35a which has been engaged in the vertically extending slot area of the L-shaped slot 31a in the rectangular movable plate 31 (FIG. 5b) is moved and is engaged in the horizontally extending slot area of the L-shaped slot 31a (FIG. 5c). In this condition, the crank wheel 30 is held in position ready to rotate in a counterclockwise direction to allow the rack 8f, that is, the guiding element 8, to move to the initial position if the engagement between the groove 40b and the pin 8i is released.

Just before the termination of the movement of the sliding block 40 to the engaged position, the slanted edge 47c of the retaining lever 47 engages with the slanted face 40g of the sliding block 40 and the segment 52c is, therefore, held in contact with the electromagnet 54 with the lever 47 having pivoted clockwise as viewed in FIG. 11a. Accordingly, the sliding block 40 is held in the engaged position. Just about the same moment, the leading edge of the projection 40f comes into contact with and pushes the upwardly bent projection 77a of the plate 77 (FIG. 11c) causing the leg projection 8j to be inserted in the concaved recess 77e in the plate 77 for allowing the transmission mechanism 73 to move from the engaged position to the disengaged position. Accordingly, the pinion gear 45 does no longer drive the sliding block 40 and the sliding block 40 is held in the engaged position by the retaining lever 47.

When the main switch 55 is subsequently turned off, the electromagnet 54 is de-energized. Since the biasing force of the spring 41 urging the sliding block 40 to the disengaged position is stronger than the biasing force of the spring 56 urging the segment 52c to the electromagnet 54, the deenergization of the electromagnet 54 results in disengagement of the retaining lever 47 from the slanted face 40g for returning the sliding block 40 to the disengaged position. While the sliding block 40 is moved from the engaged position to the disengaged position, the rolls 1e and 16d are returned to the raised position for raising the cassette holder 1 and also for shifting the T-shaped supporting plate 20 to the inoperative positon and, thereafter, the pin 8i of the guiding element 8 is disengaged from the groove 40b of the sliding block 40. Thus, the guiding element 8 carrying the cassette is moved from the inserted position towards the initial position. Simultaneously with the movement of the guiding element 8 from the inserted position towards the initial position, the motor control switch 69 is turned off to de-energize motor 61.

The cassette can also be expelled from the inserted position to the partly inserted position without turning off the main switch 55. This is done by pushing in manually operable lever 57 having an upward projection 57c (FIG. 4). A push of lever 57 results in the opening of switch 58 to de-energize electromagnet 54. Then, the operations already described above are carried out to bring the cassette to the partly inserted position.

If the cassette is fully inserted when the main switch 55 is off, the guiding element 8 is held in the inserted position only by the intake mechanism 28. In this case, manually pushing lever 57 causes an upward push on crank lever 35, moving pin 35a out of vertical slot area of L-shaped slot 31a. Accordingly, the intake mechanism releases the guiding element 8, thus ejecting the cassette as the guiding element 8 moves from its inserted position to the initial position.

Although the present invention has been fully described by way of example with reference to the accompanying drawings, various equivalent embodiments having changes and modifications will be apparent to those skilled in the art. Therefore, such changes and modifications are included in the invention unless they depart from its true scope.

What is claimed is:

1. A cassette loading and unloading device adapted to be connected to an electric power source for loading and unloading a cassette comprising:
   (a) guiding means, movable between an initial position and an inserted position, adapted to receive the cassette and guide it to an unloaded condition when moved to the initial position and to guide the cassette to a loaded condition when moved to the inserted position;
   (b) first bias means for biasing the guiding means towards the initial position;
   (c) an intake mechanism means operatively associated with the guiding means, and including second bias means having a greater biasing force than the first bias means for biasing the guiding means towards the inserted position, said intake mechanism adapted to forcibly draw the guiding means, when manually pushed to an intermediate position between the initial and inserted positions, to the inserted position by the force of the second bias means;

(d) locking means, movable between a lock position and an unlock position, being moved into the lock position for restraining the guiding means in the inserted position, and being moved into the unlock position for releasing the guiding means to allow the first bias means to return the guiding means from the inserted position back to the initial position;

(e) a disabling means, operatively associated with the locking means, for disabling the intake mechanism means to disengage the second bias means from the guiding means when the locking means is moved to the lock position;

(f) actuating means, operatively associated with the locking means, adapted for connection to the electric power source for energization thereby, said actuating means being adapted to restrain the locking means in the lock position only when both the actuating means is energized by the power source and when the locking means is shifted to the lock position, whereby if the power from the power source is cut off when the cassette is in the loaded condition, the actuating means will be de-energized and cease restraining the locking means in the lock position, allowing the locking means to move from the lock position to the unlock position, and permitting the first bias means to return the guiding means back to the initial position to guide the cassette to the unloaded position.

2. A cassette loading and unloading device as claimed in claim 1 wherein said actuating means includes an electromagnet means adapted to be energized by the power source and said locking means includes a metallic segment adapted to be held by the attractive force of the electromagnet to restrain the locking means in the lock position, whereby when the power is cut off, the electromagnet means is de-energized for releasing the metallic segment and thus locking means.

3. A cassette loading and unloading device as claimed in claim 1, further comprising:

(a) carrying means for carrying a magnetic head and a pinch roller, the carrying means being movable between an operative position in which the magnetic head is positioned in a travel path of and slidingly engages with a megnetic tape carried by the cassette and the pinch roller squeezes a portion of the magnetic tape against a rotatable capstan, and an inoperative position in which the magnetic head is held away from the magnetic tape, and the pinch roller is held away from the capstan; and (b) linking means, connected between the locking means and the carrying means, for shifting the carrying means to the operative position when the locking means is moved to the lock position and for shifting the carrying means to the inoperative position when the locking means is moved to the unlock position.

4. A cassette loading and unloading device as claimed in claim 1, wherein said intake mechanism comprises:

(a) a crank wheel having a pinion gear engaged with a rack formed on and carried by the guiding means and extending parallel to the direction of movement of the guiding means;

(b) a crank lever having a first and a second ends, the first end being pivotally connected to a peripheral portion of the crank wheel in eccentric relation to the axis of rotation of said crank wheel;

(c) a movable plate supported for movement in a radial direction of the crank wheel between a first position in which the movable plate is located remote from the crank wheel and a second position in which the movable plate is located close to the crank wheel, said movable plate having an actuatable engaging means adapted to pivotal engagement between the movable plate and the second end of the crank lever when enabled, and for disengagement therebetween when disabled;

(d) fourth bias means for biasing the movable plate towards the first position; and wherein the disabling means comprises:

(e) a second actuating means, operatively associated with the locking means, (1) for enabling the actuatable engaging means, when said locking means is in the unlock position, to permit the movable plate to move from the first position to the second position in response to the movement of the guiding means from initial position to intermediate position, and further to permit the movable plate to return from the second position to the first position by the action of the third bias means so as to move the guiding means from the intermediate position to the inserted position, and (2) for disabling the actuatable engaging means, when said locking means is in the lock position.

5. A cassette loading and unloading device as claimed in claim 4, wherein said actuatable engaging means comprises a horizontal slot formed in the movable plate and extending in a direction parallel to the direction of movement of the movable plate and a vertical slot extending from and in communication with one end of the horizontal slot remote from the crank wheel and a pin projection rigidly extending from said second end of the crank lever for slidable engagement in the horizontal and vertical slots.

6. A cassette loading and unloading device as claimed in claim 5, wherein said second actuating means includes means for urging the pin projection to engage in the vertical slot when the locking means is in the unlock position and means for moving the pin projection from the vertical slot into the horizontal slot after the locking means is turned from the unlock position to the lock position.

7. A cassette loading and unloading device as claimed in claim 6, wherein said movable plate slightly moves towards the first position when the pin projection is moved from the vertical slot into the horizontal slot so as to prevent the pin projection from being again engaged in the vertical slot by the urging means.

8. A cassette loading and unloading device as claimed in claim 1, further comprising third bias means for biasing the locking means towards the unlock position, and shifting means for shifting the locking means from its unlock position to the lock position against the third bias means when the guiding means is moved to the inserted position.

* * * * *